(12) United States Patent
Shigenobu et al.

(10) Patent No.: US 9,015,600 B2
(45) Date of Patent: Apr. 21, 2015

(54) DISPLAY INPUT DEVICE, IMAGE FORMING APPARATUS, DISPLAYING METHOD OF A DISPLAY INPUT DEVICE

(75) Inventors: Dai Shigenobu, Osaka (JP); Keiko Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 532 days.

(21) Appl. No.: 13/026,366

(22) Filed: Feb. 14, 2011

(65) Prior Publication Data

US 2011/0228321 A1    Sep. 22, 2011

(30) Foreign Application Priority Data

Mar. 18, 2010   (JP) ................................. 2010-062929

(51) Int. Cl.
*G06F 3/00* (2006.01)
*H04N 1/00* (2006.01)

(52) U.S. Cl.
CPC ....... *H04N 1/00416* (2013.01); *H04N 1/00384* (2013.01); *H04N 1/00424* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,421,509 B1* | 7/2002 | Nomura et al. | 399/81 |
| 7,920,886 B1* | 4/2011 | Lai et al. | 455/518 |
| 2004/0194026 A1* | 9/2004 | Barrus et al. | 715/515 |
| 2005/0179957 A1* | 8/2005 | Matsuda et al. | 358/400 |
| 2007/0206754 A1* | 9/2007 | Ueda et al. | 379/201.01 |
| 2008/0016460 A1* | 1/2008 | Park | 715/783 |
| 2009/0083230 A1* | 3/2009 | Watanabe et al. | 707/3 |
| 2009/0199109 A1 | 8/2009 | Doui | |
| 2009/0237699 A1* | 9/2009 | Umezawa | 358/1.13 |
| 2010/0033439 A1* | 2/2010 | Kodimer et al. | 345/173 |

FOREIGN PATENT DOCUMENTS

| | | |
|---|---|---|
| CN | 1770067 A | 5/2006 |
| JP | 2003-330597 | 11/2003 |
| JP | 2008-47027 | 2/2008 |
| JP | 2009-181382 | 8/2009 |
| JP | 2009-267498 | 11/2009 |

* cited by examiner

*Primary Examiner* — William Bashore
*Assistant Examiner* — Rayeez Chowdhury
(74) *Attorney, Agent, or Firm* — Smith, Gambrell & Russell LLP

(57) ABSTRACT

A display input device includes an input unit which receives an operation input, and a display unit which displays a screen for operation input and includes an input result display area for displaying at least a number and a character. When there is an available function for inputting the number and the character, an input button for using the available function is displayed in the input result display area or in an adjacent area of the input result display area, while when there is no available function, the button is not displayed in the input result display area or in the adjacent area of the input result display area.

5 Claims, 8 Drawing Sheets

DISPLAY INPUT DEVICE, IMAGE FORMING APPARATUS, DISPLAYING METHOD OF A DISPLAY INPUT DEVICE

CROSS-REFERENCE TO RELATED APPLICATIONS

This application is based upon and claims the benefit of priority from the corresponding Japanese Patent Application No. 2010-062929 filed on Mar. 18, 2010, the entire contents of which are incorporated herein by reference.

BACKGROUND OF THE INVENTION

1. Field of the Invention

The present invention relates to a display input device including a display unit and an input unit such as a touch panel, and also relates to an image forming apparatus equipped with the same, such as a copier, a multifunction peripheral, a printer, or a fax machine.

2. Description of Related Art

For instance, an image forming apparatus such as a copier or a multifunction peripheral is equipped with display input device that user can select and set among the functions. For instance, the display input device has a touch panel display unit that displays screens and buttons for input, a plurality of hardware keys, and the like. However, when many types of functions are equipped, an input procedure of the display input device and a display on the screen are apt to be complicated. For this reason, an inexperienced user may be confused about which operation to perform next. Therefore, there is known a device considering such inexperienced users.

For instance, there is known an input/output device, which detects an end of a predetermined job step in a flow and generates a signal change for leading an operator to an operation key to be operated next necessary for a next job step or an input step, such as a light emission, a blinking, or a pop-up of the operation key to be operated next or in the vicinity of the operation key. With this structure, it is aimed to solve the difficulty in finding the operation key to be operated next, and to provide an input/output device that is easy to use a desired function in accordance with a procedure for even an inexperienced person.

For instance, the display input device such as an image forming apparatus displays screens for operation and setting on the touch panel liquid crystal display unit. Further, the display input device receives input of a number, a character, a symbol, or the like, reflects a result of the input, and may display the same. For instance, the input characters and the like represent a transmission destination or a name of the image data.

Further, there is a case where the display input device is equipped with a function of assisting input of numbers, characters, and symbols. For instance, there is a function in which a desired history of input of numbers or the like that has been performed previously can be called so that the input state of the called history of input of numbers or the like is restored. Thus, it is possible to save time and strokes for input of the same numbers, characters, or symbols. A button for using this input assist function is displayed on the touch panel display unit, for example.

On the other hand, the input assist function cannot always be used. For instance, the above-mentioned function of referring to the input history cannot be used if there is no input history. In this way, there is an input assist button whose state is changed between enabled (the function can be used when the button is pressed) and disabled (the function cannot be used when the button is pressed) in accordance with a state of the image forming apparatus or the display input device.

In general, it is possible to input numbers or characters without using the input assist button of numbers or the like. In addition, the enable and disable are switched. Therefore, importance thereof may be regarded to be low. From these situations, the input assist button may be displayed at a position distant from an input result display area of the numbers or the like. However, when the input result display area of the numbers or the like and the input assist button of the numbers or the like are distant from each other, there is a problem that it is difficult to know which area the operation of the button is reflected on.

In particular, a small size panel (e.g., 4.3 inches) may be used as the display unit of the image forming apparatus or the like. Even the small size panel is required to display a certain amount of information in one screen. Therefore, for convenience of a display layout, the input result display area of the numbers or the like may be distant from the input assist button for the numbers or the like.

In addition, image data of a screen displayed on the display unit is usually fixed, so a position of the button is fixed. Conventionally, the input assist button for the numbers or the like in the disabled state is gray-out displayed or displayed in a translucent manner. However, there is a problem that the display of the disabled button for the input assist is a waste of the screen area. In particular, as a panel size of the display unit is smaller, a degree of waste of the screen area increases relatively.

Note that the above-mentioned conventional input/output device can provide an index for the operation key to be operated next, but the reflection or the action when the operation key is pressed is not shown. Therefore, the problem that it is not clear which area the operation of the button is reflected on cannot be solved. In addition, the problem of the waste of the screen area due to display of the disabled button cannot be solved, too.

SUMMARY OF THE INVENTION

In view of the above-mentioned problem in the conventional technique, an object of the present invention is to eliminate the waste of display so as to convey information securely while providing understanding through intuition about the area on which the use timing and button operation are reflected, by displaying the button for the input in the input result display area or in the vicinity thereof only when the function can be used, even if a panel size of the display unit is small.

In order to achieve the above-mentioned object, a display input device according to an aspect of the present invention includes an input unit which receives an operation input, and a display unit which displays a screen for operation input and includes an input result display area for reflecting the input to the input unit so as to display at least a number and a character, in which when there is an available function for inputting the number and the character, an input button for using the available function is displayed in the input result display area or in an adjacent area the input result display area, while when there is no available function, the button is not displayed in the input result display area or in the adjacent area the input result display area.

According to the present invention, a waste of display can be eliminated, and it is possible to provide understanding through intuition about the area on which the use timing and button operation are reflected. In addition, it is possible to inform the user of information securely that the button is available.

Further features and advantages of the present invention will become apparent from the description of embodiments given below.

BRIEF DESCRIPTION OF THE DRAWINGS

FIG. 4A illustrates a case where a re-addressing button is displayed, while FIG. 4B illustrates a case where the re-addressing button is not displayed.

FIG. 5A illustrates a case where the re-addressing button is displayed, while FIG. 5B illustrates a case where the re-addressing button is not displayed.

FIG. 6A illustrates a case where a conversion button is displayed, while FIG. 6B illustrates a case where the conversion button is not display.

FIG. 7A illustrates a case where the history button is displayed, while FIG. 7B illustrates a case where the history button is not displayed.

DETAILED DESCRIPTION OF THE PREFERRED EMBODIMENTS

Hereinafter, an embodiment of the present invention will be described with reference to FIGS. 1 to 7. Here, in this embodiment, a multifunction peripheral 100 (corresponding to the image forming apparatus) including an operation panel 1 (corresponding to the display input device) is exemplified for description. However, elements of a structure and a layout described in this embodiment are merely examples for description and do not limit the scope of the invention.

(Outline of Multifunction Peripheral 100)

Figure 1:
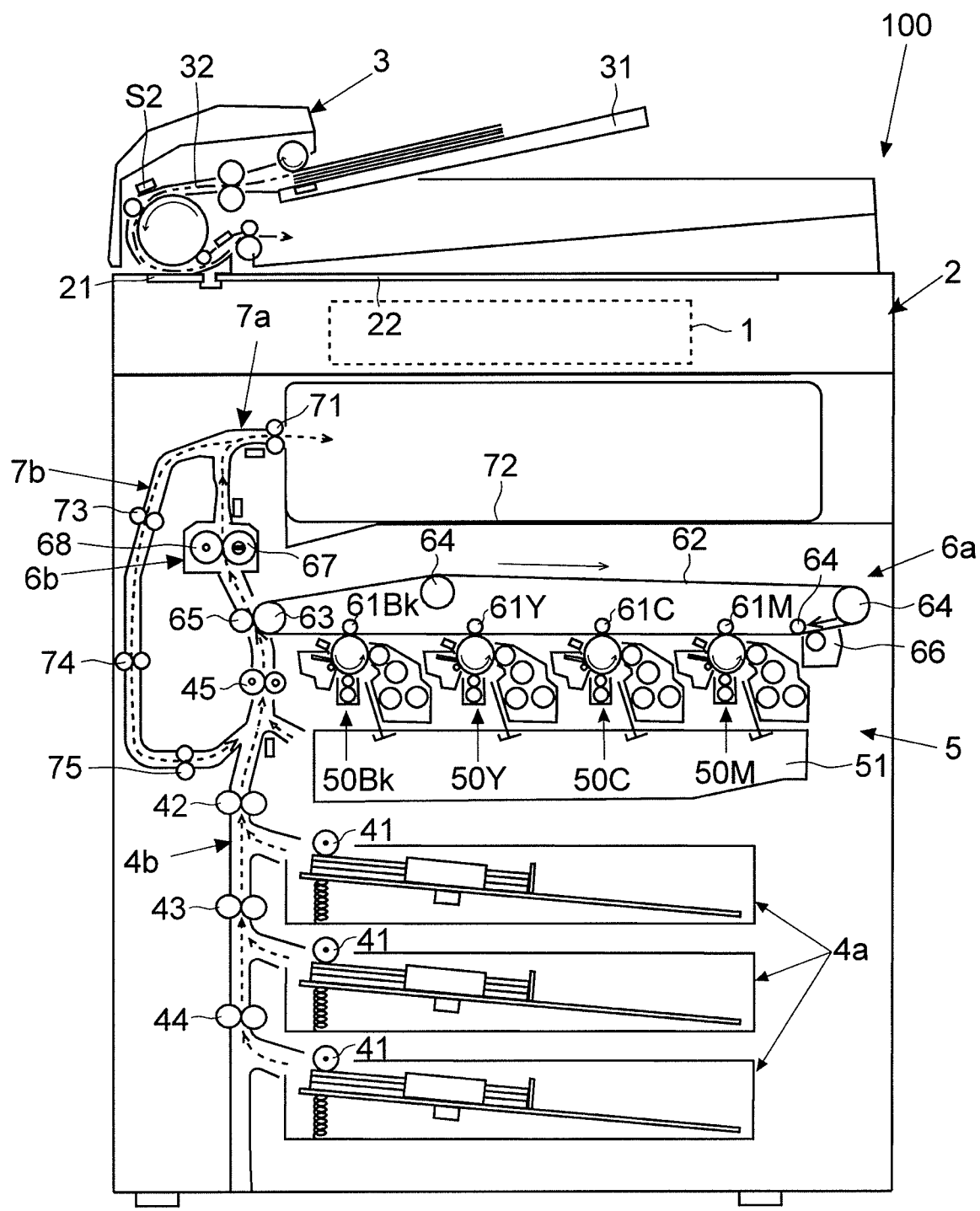
FIG. 1 is a front schematic cross section illustrating an example of a multifunction peripheral according to an embodiment.

First, with reference to FIG. 1, an outline of the multifunction peripheral 100 according to the embodiment of the present invention will be described. FIG. 1 is a front schematic cross section illustrating an example of the multifunction peripheral 100 according to the embodiment of the present invention.

First, as illustrated in FIG. 1, the operation panel 1 for performing various setting about the multifunction peripheral 100 is disposed on the front part of the multifunction peripheral 100 (as illustrated by a broken line, and details thereof will be described later). Further, an image reader unit 2 and a document feeding device 3 are disposed on the upper part. In addition, inside the multifunction peripheral 100, there are disposed a paper sheet feeder 4a, a transport path 4b, an image forming unit 5, an intermediate transferring unit 6a, a fixing unit 6b, a sheet delivery unit 7a, a two-sided transport path 7b, and the like.

The document feeding device 3 includes a document tray 31 on which a document to be read is placed. Further, the document feeding device 3 feeds the document automatically from the document tray 31 continuously one by one sheet to a reading position (contact glass for feed reading 21). In addition, the document feeding device 3 is attached to the image reader unit 2 in an openable and closable manner in the up and down direction about a pivot axis on the back side of paper in FIG. 1. The document feeding device 3 works as a cover pressing contact glasses (contact glass for feed reading 21 and contact glass for place reading 22) of the image reader unit 2 from the upside.

Next, as illustrated in FIG. 1, the image reader unit 2 includes the contact glass for feed reading 21 and the contact glass for place reading 22 disposed on the upper face thereof. The latter is used for placing a document when the document such as a book is read one by one page. Inside the image reader unit 2, there are disposed a lamp, minors, lenses, an image sensor, and the like (not shown). The image sensor reads a document sheet that passes on the contact glass for feed reading 21, or reads a document placed on the contact glass for place reading 22 on the basis of reflection light from the document. Further, the image sensor converts the reflection light into an analog electric signal corresponding to an image density and then performs digitization, so that image data of the document is obtained. Note that the image reader unit 2 of this embodiment can also read color as well as monochrome.

Each of a plurality of paper sheet feeders 4a in the main body of the multifunction peripheral 100 houses a plurality of paper sheets of each size (e.g., A4, B4, or the like) and each type (e.g., copy paper, recycled paper, cardboard, OHP sheet or the like). Each paper sheet feeder 4a has a paper feed roller 41 that is driven to rotate so as to feed paper sheets one by one to the transport path 4b when the printing is performed.

The transport path 4b is a path for conveying paper sheets from the paper sheet feeder 4a to the image forming unit 5 in the apparatus. Further, in the transport path 4b, there are disposed a guide plate for guiding paper sheets, transport roller pairs 42, 43, and 44 that are driven to rotate when the paper sheets are conveyed, a resist roller pair 45 which lets the conveyed paper sheet wait before the image forming unit 5 and sends out the paper sheet in synchronization with transfer timing of a formed toner image, and the like.

The image forming unit 5 includes a plurality of image forming units 50 (50Bk for black, 50Y for yellow, 50C for cyan, and 50M for magenta), and an exposure device 51. The exposure device 51 outputs a laser beam while turning on and off the same on the basis of image data read by the image reader unit 2 or image data stored in a storage device 92 that will be described later, so as to scan and expose each photosensitive drum. The image forming unit 50 includes a photosensitive drum that is supported in a rotatable manner by being driven, and an electrifying device, a developing device, a cleaning device and the like that are disposed around the photosensitive drum. Further, a toner image is formed by each image forming unit 50 and the exposure device 51 on the circumferential surface of the photosensitive drum.

The intermediate transferring unit 6a receives a primary-transferred toner image from each image forming unit 50 and performs secondary transferring on the sheet. The intermediate transferring unit 6a includes primary transferring rollers 61Bk to 61M, an intermediate transferring belt 62, a drive roller 63, a plurality of idler rollers 64, a secondary transferring roller 65, a belt cleaning device 66, and the like. An endless intermediate transferring belt 62 is sandwiched between each of the primary transferring rollers 61Bk to 61M and the corresponding photosensitive drum. A transferring voltage is applied to each of the primary transferring rollers 61Bk to 61M, so that the toner image is transferred to the intermediate transferring belt 62.

The intermediate transferring belt 62 is wound and stretched around the drive roller 63 and the like, and is driven to turn by rotation of the drive roller 63 connected to a drive mechanism such as a motor (not shown). In addition, the intermediate transferring belt 62 is sandwiched between the drive roller 63 and the secondary transferring roller 65. The toner images (of black, yellow, cyan, magenta colors) formed in the individual image forming units 50 are sequentially superposed precisely so as to be transferred onto the intermediate transferring belt 62 as primary transferring. After that, the toner image is transferred onto a sheet by the secondary transferring roller 65 to which a predetermined voltage is applied.

The fixing unit 6b fixes the toner image that is transferred onto the paper sheet. The fixing unit 6b is mainly constituted of a heating roller 67 in which a heating element is embedded, and a press roller 68 that presses the heating roller 67. Further, when the paper sheet passes through a nip between the heating roller 67 and the press roller 68, the toner is melted and heated so that the toner image is fixed onto the paper sheet.

The sheet delivery unit 7a is disposed on the downstream side of the fixing unit 6b in the conveying direction of the paper sheet. In addition, the sheet delivery unit 7a is connected to the two-sided transport path 7b that conveys a paper sheet whose one side has been printed to the upstream side of the resist roller pair 45 again when the two-sided print is performed.

The sheet delivery unit 7a includes a delivery roller pair 71 that can rotate in both directions. The paper sheet that has passed through the fixing unit 6b is conveyed to the delivery roller pair 71. Further, the delivery roller pair 71 rotates in the direction for conveying the paper sheet to a delivery tray 72 when the one-sided print or the two-sided print is completed. As a result, the printed paper sheet is delivered to the delivery tray 72.

On the other hand, when the delivery roller pair 71 receives a paper sheet whose one side has been printed in the two-sided printing, it rotates in the direction for delivering the paper sheet whose one side has been printed to the delivery tray 72. Further, the delivery roller pair 71 reverses the rotation direction before the paper sheet whose one side has been printed is ejected. By this switchback action, the paper sheet is conveyed oppositely into the apparatus and is led to the two-sided transport path 7b.

A plurality of transport roller pairs 73, 74, and 75 for two-sided printing are disposed in the two-sided transport path 7b. The transport roller pairs 73 to 75 for two-sided printing rotate so as to lead the paper sheet whose one side has been printed to the upstream of the resist roller pair 45.

(Operation Panel 1)

Figure 2:
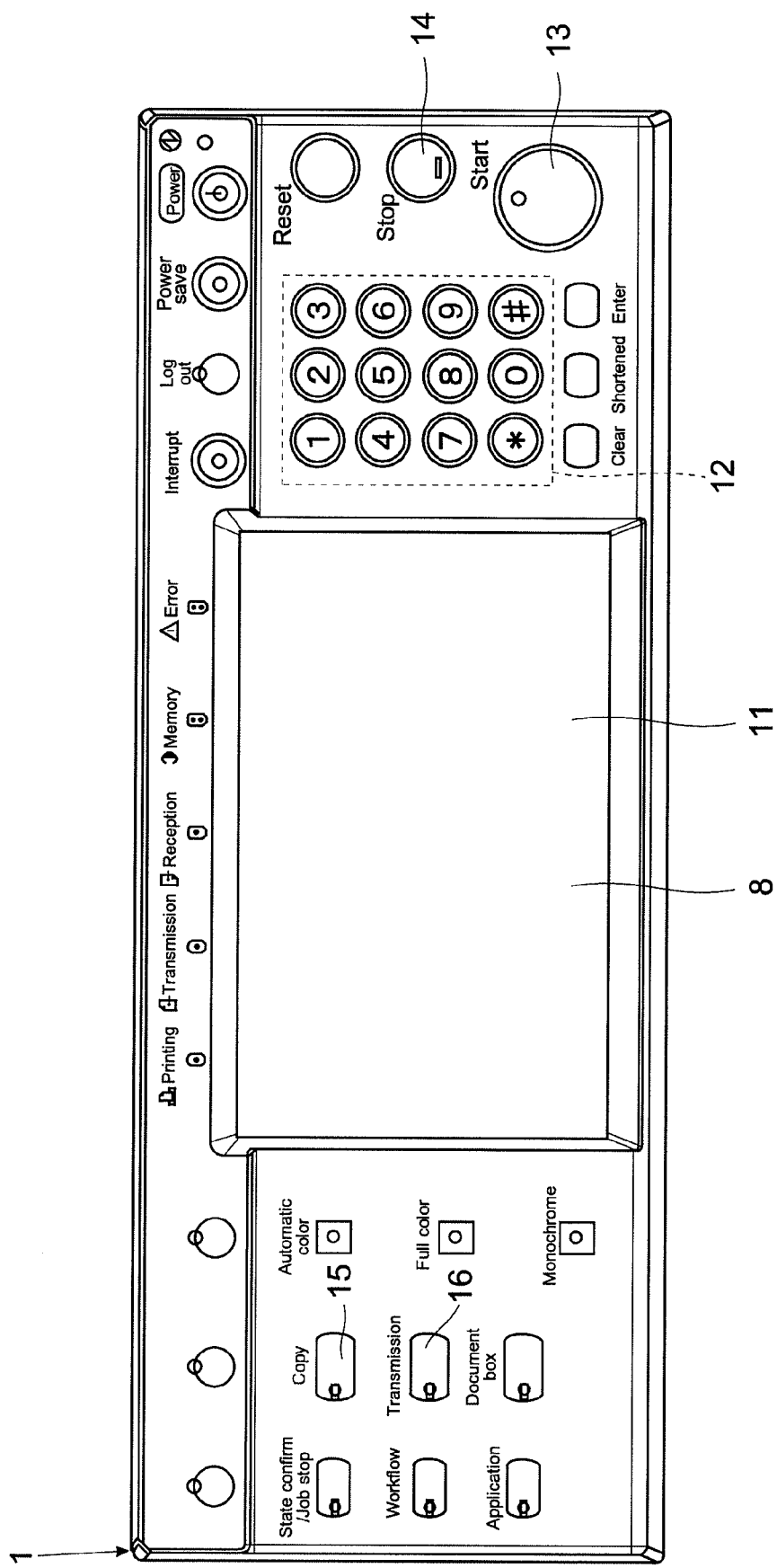
FIG. 2 is a plan view illustrating an example of an operation panel according to the embodiment.

Next, with reference to FIG. 2, an example of the operation panel 1 according to the embodiment of the present invention will be described. FIG. 2 is a plan view illustrating an example of an operation panel 1 according to an embodiment of the present invention.

As illustrated in FIGS. 1 and 2, the operation panel 1 (corresponding to the display input device) is disposed on the upper side of the front face of the multifunction peripheral 100. The operation panel 1 includes a liquid crystal display unit 8 (corresponding to the display unit) that displays menus and keys for setting the multifunction peripheral 100 and for instructing an action of the same (see FIGS. 5A and 5B and others). The liquid crystal display unit 8 displays various images and screens such as a message of a state of the multifunction peripheral 100 or the like. The user can press a key displayed on the liquid crystal display unit 8 so as to perform various settings and operation instructions for the copy or transmission action in the multifunction peripheral 100.

Further, a touch panel unit 11 (corresponding to the input unit) is disposed on the upper surface of the liquid crystal display unit 8. The touch panel unit 11 detects a position or coordinates of the part where the user has pressed on the liquid crystal display unit 8. The coordinates detected by the touch panel unit 11 are compared with positions or coordinates of various keys displayed on the liquid crystal display unit 8 so that the key pressed by the user is specified. Further, as the touch panel unit 11 various types can be adopted without a limitation, which include a resistance film type, a surface acoustic wave type, an infrared type, a capacitance type.

In addition, hardware keys (buttons) are provided to the operation panel 1 as follows. For instance, there are provided a ten-key unit 12 for numeric input, a start key 13 for instructing to start a job such as copying after various setting, a stop key 14 for stopping the started job, and the like. In addition, there are a copy key 15 that is pressed when a copy function is used, and a transmission key 16 that is pressed when a scanner function or a fax function is used. In this way, the touch panel unit 11 and the various hardware keys are provided to the operation panel 1, so that the touch panel unit 11 and the various hardware keys work as the input unit for various settings and mode selections in each function of the multifunction peripheral 100.

(Hardware Structure of Multifunction Peripheral 100 or the Like)

Figure 3:
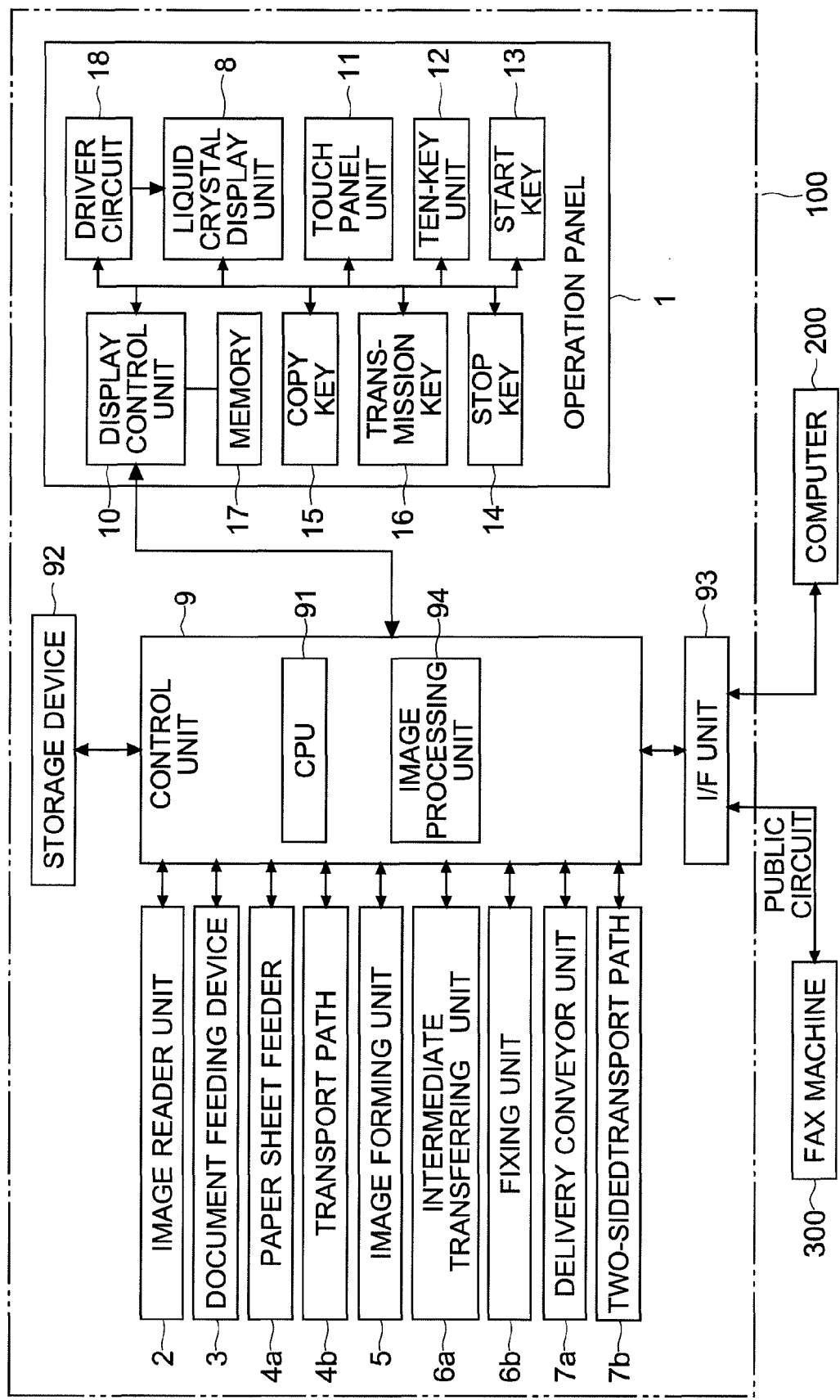
FIG. 3 is a block diagram illustrating an example of a hardware structure of the multifunction peripheral according to the embodiment.

Next, with reference to FIG. 3, an example of a hardware structure of the multifunction peripheral 100 according to the embodiment of the present invention will be described. FIG. 3 is a block diagram illustrating an example of a hardware structure of the multifunction peripheral 100 according to the embodiment of the present invention.

First, a main body of the multifunction peripheral 100 will be described. A control unit 9 is disposed in the main body of the multifunction peripheral 100. The control unit 9 is connected to, for example, the operation panel 1, the document feeding device 3, the image reader unit 2, the paper sheet feeder 4a, the transport path 4b, the image forming unit 5, the fixing unit 6b, and the like, so as to control them.

The control unit 9 includes devices such as a CPU 91, for example. The CPU 91 performs operations and the like on the basis of a control program that is stored in the storage device 92 (corresponding to the storage unit) and is loaded, so as to control each unit of the multifunction peripheral 100. Further, as the control unit 9, a plurality of control units may be disposed for individual functions, which includes a main control unit for general control and image processing, and an engine control unit for image formation and control of the printing action by turning on and off motors or the like for driving various rotation members. This description exemplifies an embodiment in which they are integrated in one control unit.

The storage device 92 is connected to the control unit 9. The storage device 92 is constituted as a combination of a nonvolatile storage device and a volatile storage device, which includes a ROM, a RAM, an HDD, and the like. The storage device 92 can store a program for controlling the multifunction peripheral 100 and various data such as setting data, image data, and the like.

Further, the control unit 9 is connected to an interface unit (hereinafter, I/F unit 93) having various connectors, sockets, a fax modem, and the like. The I/F unit 93 is connected to a plurality of external computer 200 (e.g., personal computers) and a fax machine 300 on the other side via a network, a public line, or the like (each one of them is illustrated in FIG. 3 for convenience sake). For instance, image data obtained by the image reader unit 2 can be stored in the storage device 92, or can be transmitted to the external computer 200 or the fax machine 300 on the other side (as the scanner function or the fax function). In addition, it is also possible to perform printing, fax transmission, or the like on the basis of the image data received from the external computer 200 or the fax machine 300 on the other side and is received by the multifunction peripheral 100 (as a printer function or the fax function).

In addition, the control unit 9 performs communication with the operation panel 1 so as to recognize an input performed by the operation panel 1, and controls the multifunction peripheral 100 so that the copy or the like is performed in accordance with setting by the user. For instance, when the paper sheet feeder 4a to be used is specified and the copy job is instructed by using the operation panel 1, the control unit 9 controls the specified paper sheet feeder 4a to feed a paper sheet. In addition, the control unit 9 controls the I/F unit 93 to transmit image data to a transmission destination specified by the operation panel 1.

In addition, for example, an image processing unit 94 is disposed in the control unit 9. The image processing unit 94 performs image processing on image data obtained by reading a document by the image reader unit 2 or image data input to the multifunction peripheral 100 via the I/F unit 93. The image data processed by the image processing unit 94 is transmitted, for example, to the exposure device 51 so as to be used for scanning and exposing the photosensitive drum, or to the I/F unit 93 so as to be delivered externally.

The operation panel 1 of this embodiment includes a display control unit 10, a memory 17 (corresponding to the storage unit), a driver circuit 18, a liquid crystal display unit 8, and the touch panel unit 11. The display control unit 10 is constituted of a CPU, an IC, or the like. The display control unit 10 controls display on the liquid crystal display unit 8, receives output of the touch panel unit 11, and specifies coordinates of the position pressed on the liquid crystal display unit 8. The data such as a table indicating correspondence between output of the touch panel unit 11 and the coordinates is stored in the memory 17. The display control unit 10 compares the coordinates of the pressed position with image data of each setting screen so as to specify and recognize the key selected (pressed) on the setting screen.

Specifically, in order to select a set item of each function of the multifunction peripheral 100 and to set a set value, the user repeats selection of keys displayed on the liquid crystal display unit 8 from a display of the top layer on the liquid crystal display unit 8. Further, display control unit 10 controls the liquid crystal display unit 8 to switch display for each key selection, so that a set value of the function to be selected and set is finally set. The display control unit 10 recognizes that a function is selected and that a set value is set, so as to transmit a result of the recognition to the control unit 9 of the main body. Thus, the control unit 9 controls each unit such as the image forming unit 5 to perform the action on which the function selected and set by the operation panel 1 is reflected. Further, intention of the user is reflected on the printing, transmission, or the like (e.g., setting of density, or scaling).

Further, the image data of the screens and images to be displayed on the liquid crystal display unit 8 are stored in a memory 17 of the operation panel 1, for example. Therefore, the display control unit 10 reads out image data of the screen to be displayed next from the memory 17 every time when a key in a set item selection screen or each setting screen is pressed. In addition, the image data of screens and images displayed on the liquid crystal display unit 8 may be stored in the storage device 92 of the main body, for example. In this case, the operation panel 1 receives the image data for displaying on the liquid crystal display unit 8 from the storage device 92 via the main body control unit 9.

When receiving (reading) the image data, the display control unit 10 instructs a driver circuit 18 that actually controls the display on the liquid crystal screen. Note that it is possible that the operation panel 1 does not include the display control unit 10 and the memory 17, and instead, the structure of the control unit 9 (the CPU 91 and the storage device 92) performs the function of the display control unit 10 and the memory 17.

(Display or No Display of Button, Re-Addressing Button 1)

Figure 4A:
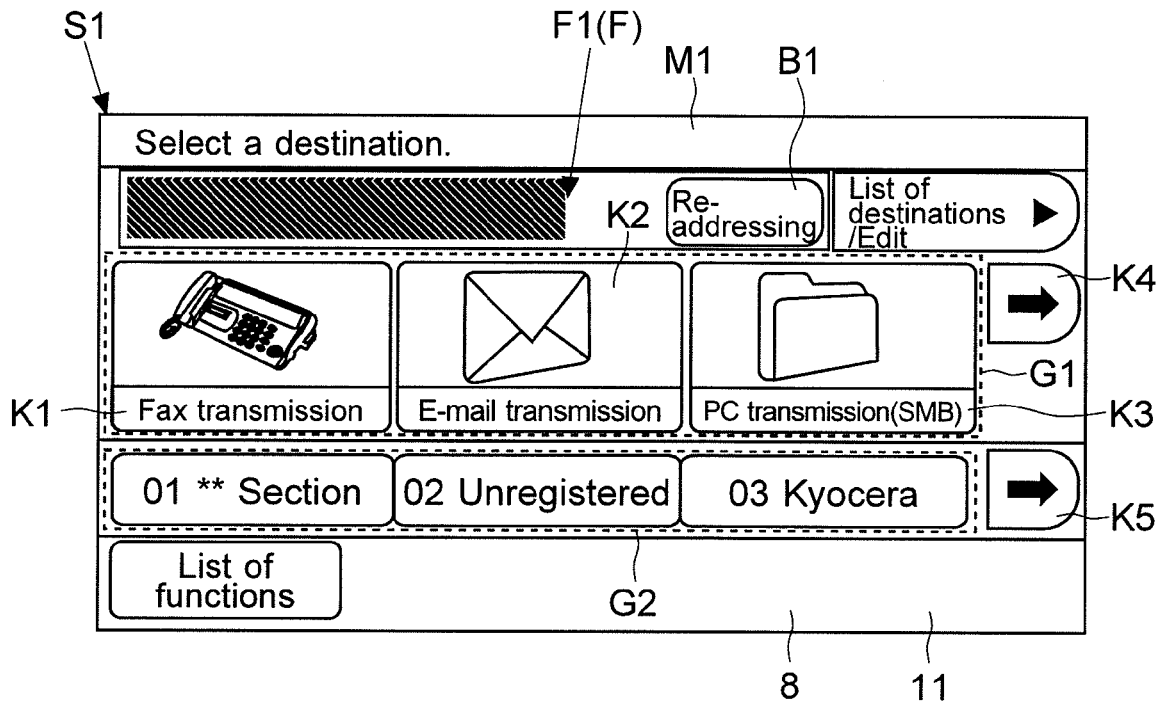
FIGS. 4A and 4B are explanatory diagrams illustrating an example of a destination input screen displayed on a liquid crystal display unit according to the embodiment.
Figure 4B:
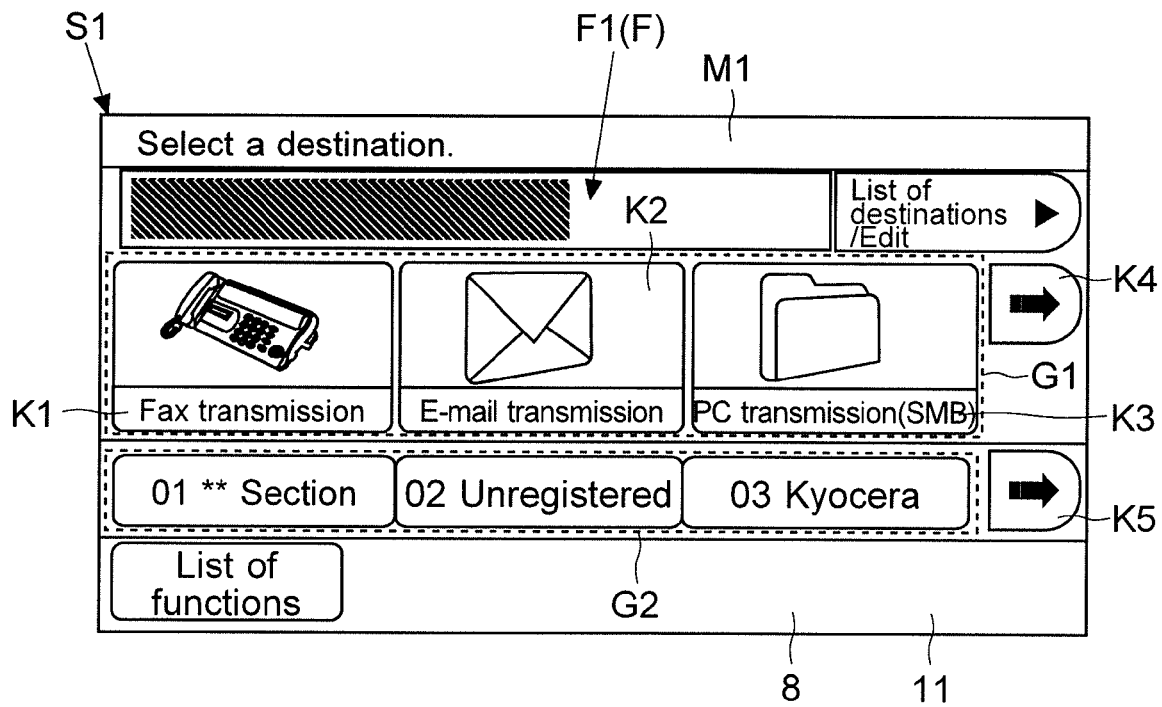

Next, with reference to FIGS. 4A and 4B, an example of display or no display of a button on the liquid crystal display unit 8 according to the embodiment of the present invention will be described with an example of a destination input screen S1. FIGS. 4A and 4B are explanatory diagrams illustrating an example of the destination input screen S1 displayed on the liquid crystal display unit 8 according to the embodiment of the present invention. FIG. 4A illustrates a case where the re-addressing button B1 is displayed. FIG. 4B illustrates a case where the re-addressing button B1 is not displayed.

The multifunction peripheral 100 in this embodiment has many settable functions. Further, in the multifunction peripheral 100 of this embodiment, there are some cases in which characters, numbers, symbols, or the like are input. For instance, characters, numbers, symbols, or the like are input in the case of inputting a transmission destination of image data of a document read by the image reader unit 2, in the case of registering a name, address information, or the like of the transmission destination, or in the case of setting a user or an administrator of the multifunction peripheral 100.

Further, the liquid crystal display unit 8 includes an input result display area F on which a result of input of characters, numbers, symbols, or the like is reflected. In other words, the liquid crystal display unit 8 reflects a result of the input on the input result display area F for displaying.

In addition, the operation panel 1 and the multifunction peripheral 100 of this embodiment include various auxiliary functions for facilitating input by the user who inputs characters, numbers, symbols, or the like. With reference to FIGS. 4A and 4B, an example of the auxiliary function in the input of characters, numbers, symbols, or the like will be described.

For instance, when the transmission key 16 is pressed, the liquid crystal display unit 8 displays the destination input screen S1 of the transmission destination of the image data illustrated in FIGS. 4A and 4B. For instance, a message display section M1 is disposed on the uppermost part of the destination input screen S1 (corresponding to the state where the message "Select a destination." is displayed in FIGS. 4A and 4B).

Further, an input result display area F1 is disposed on the lower side of the message display section M1. Specifically, an input result of the transmission destination of the image data by the user is displayed in the input result display area F1 of the destination input screen S1.

In addition, a transmission method select key group G1 for selecting a method of transmitting image data is disposed on the lower side of the input result display area F1. For instance, FIGS. 4A and 4B illustrate an example of the state where a fax transmission key K1, an e-mail transmission key K2, and a PC transmission key K3 are displayed in the transmission method select key group G1. Note that the number of keys for selecting a transmission method that can be displayed in one screen is limited (such as three in the example of FIGS. 4A and 4B). Therefore, when an arrow key K4 disposed on the right side of the transmission method select key group G1 is pressed, the liquid crystal display unit 8 displays other keys indicating other transmission methods (e.g., the Internet fax and the like).

In addition, a shortcut key group G2 is disposed on the lower side of the transmission method select key group G1. The user sets assignment of destinations to the shortcut keys in advance. Further, the user can specifies and sets a destination only by pressing each shortcut key. Note that the number of shortcut keys that can be displayed in one screen is limited (such as three in the example of FIGS. 4A and 4B). Therefore, when an arrow key K5 disposed on the right side of the shortcut key group G2 is pressed, the liquid crystal display unit 8 displays other keys indicating other shortcut keys.

Further, as illustrated in FIG. 4A, in order to assist the destination input by the user, the liquid crystal display unit 8 displays the re-addressing button B1 in the input result display area F1. In this case, the re-addressing button B1 is displayed in the input result display area F1 (the re-addressing button B1 may be displayed adjacent to the input result display area F1). In other words, the input result display area F displays an input result of the destination of the data transmission destination, and one of buttons according to the present invention is the re-addressing button B1 for calling the destination of the data transmission that was performed before.

In addition, the multifunction peripheral 100 of this embodiment saves a transmission history. The transmission history includes transmission date and time, a destination name, a destination address (a fax number, an e-mail address, a network address, and the like). This transmission history is stored in the memory 17 of the operation panel 1 or in the storage device 92 in the main body of the multifunction peripheral 100, for example. For instance, the memory 17 and the storage device 92 store the transmission history in a volatile manner, so the transmission history is lost when a main power of the multifunction peripheral is turned off.

When the re-addressing button B1 is pressed, the display control unit 10 obtains the transmission history. Further, the liquid crystal display unit 8 displays a list of transmission destinations included in the transmission history (e.g., in a pull-down menu format). Then, when the transmission destination in the display is selected (pressed), the liquid crystal display unit 8 displays the address of the transmission destination in the input result display area F1. Thus, the destination that has been input can be set without inputting each fax number or address.

Note that it is possible to adopt a configuration in which only a destination that has been used in the just previous transmission is displayed in the input result display area F1 (or is accepted as the input) when the re-addressing button B1 is pressed, in view of information security. In addition, in view of information security, it is possible to adopt a configuration in which the transmission history is erased in turn when a constant time (e.g., a few minutes to a few tens of minutes) has passed from completion of the transmission. Alternatively, it is possible to adopt a configuration in which the input function using the re-addressing button B1 is disabled instead of erasing the transmission history.

However, for example, when the transmission job has not been performed at all from the main power is turned on, or when the transmission history is erased, there is a case where the re-addressing button B1 cannot be used. In this way, when there is no transmission history to be used so that the auxiliary function of the destination input (specifying a destination) by the re-addressing button B1 cannot be used, the liquid crystal display unit 8 does not display the re-addressing button B1 as illustrated in FIG. 4B.

(Display or No Display of Button, Re-Addressing Button 2)

Figure 5A:
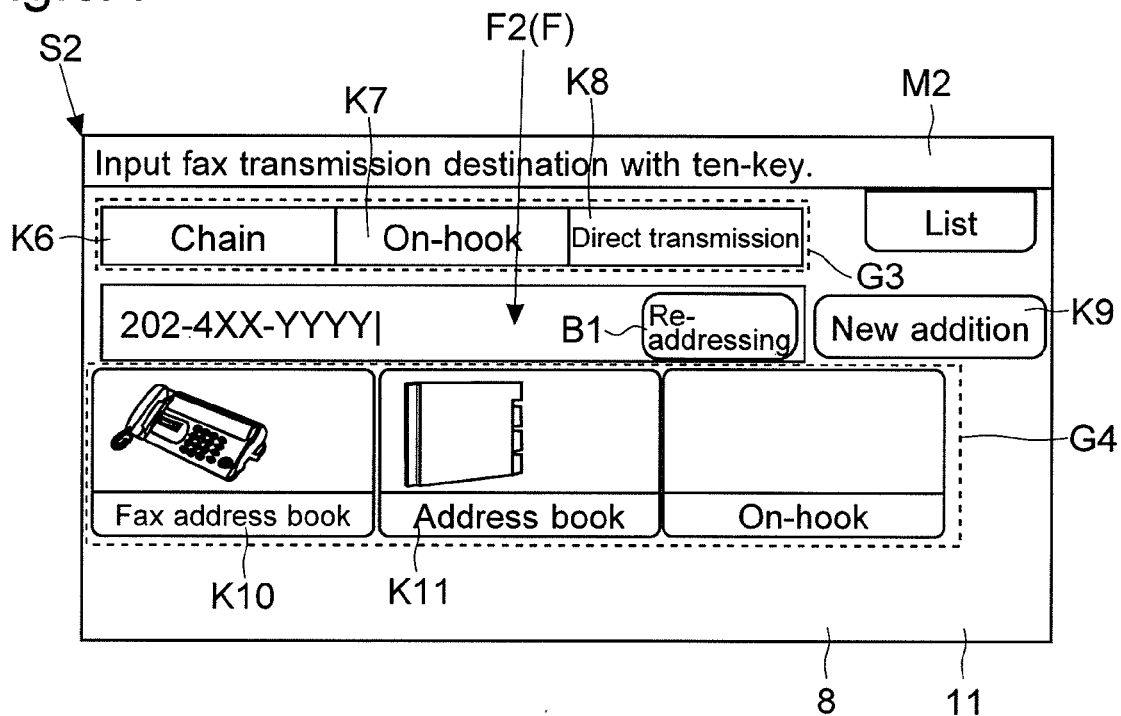
FIGS. 5A and 5B are explanatory diagrams illustrating an example of a fax transmission destination input screen displayed on the liquid crystal display unit according to the embodiment.
Figure 5B:
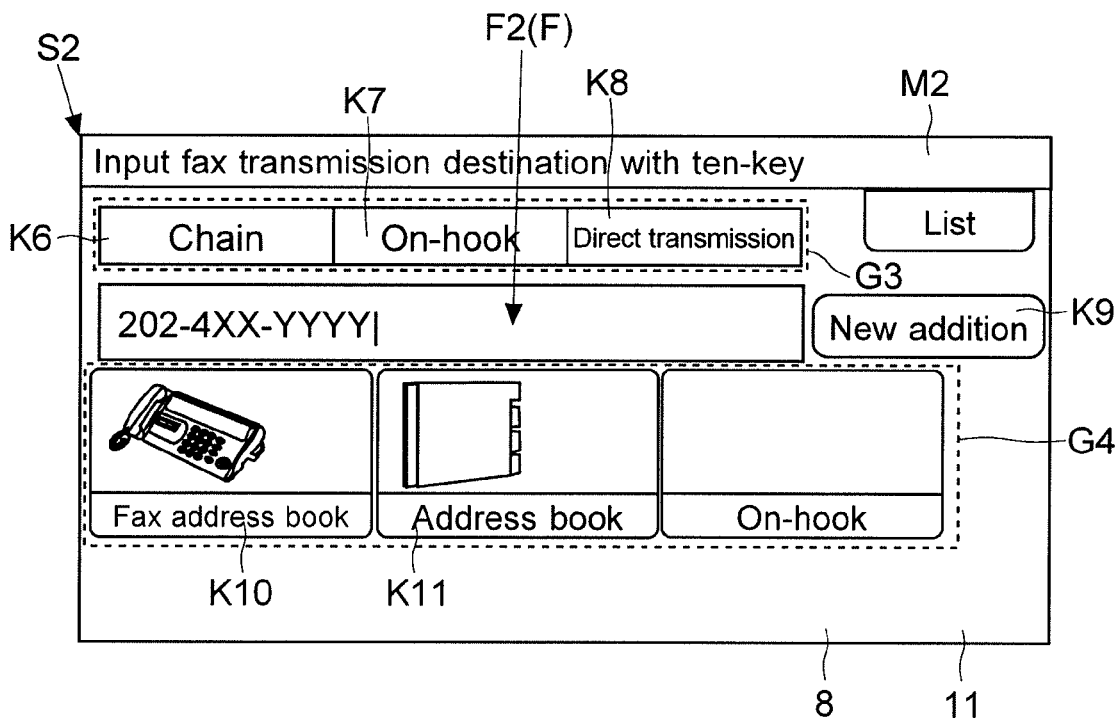

Next, with reference to FIGS. 5A and 5B, an example of display or no display of a button on the liquid crystal display unit 8 according to the embodiment of the present invention will be described with an example of a fax transmission destination input screen S2. FIGS. 5A and 5B are explanatory diagrams illustrating an example of the fax transmission destination input screen S2 displayed on the liquid crystal display unit 8 according to the embodiment of the present invention. FIG. 5A illustrates a case where the re-addressing button B1 is displayed. FIG. 5B illustrates a case where the re-addressing button B1 is not displayed.

The multifunction peripheral 100 in this embodiment has a transmission function of image data. Further, the multifunction peripheral 100 of this embodiment can perform fax transmission on the basis of image data obtained by reading by the image reader unit 2 or image data received from an external computer 200, for example. Further, FIGS. 5A and 5B illustrate an example of the input screen for the fax transmission destination.

First, when the fax transmission key K1 is pressed in the destination input screen S1 illustrated in FIG. 4A and displays the fax transmission destination input screen S2 of the image data illustrated in FIGS. 5A and 5B, for example. Also in this fax transmission destination input screen S2, a message display section M2 is disposed on the uppermost part, for example (FIGS. 5A and 5B illustrate an example of displaying a message "Input fax transmission destination with ten-key.").

Further, a transmission function key group G3 for selecting a fax transmission method is disposed on the lower side of the message display section M2. For instance, FIGS. 5A and 5B illustrate an example where a chain key K6 that is pressed when a chain transmission function is used, an on-hook key K7 that is pressed when an on-hook transmission function is used, and a direct transmission key K8 that is pressed when a direct transmission function is used are displayed in the transmission function key group G3.

In addition, an input result display area F2 is disposed on the lower part of the transmission function key group G3. Specifically, the input result display area F2 in the fax transmission destination input screen S2 displays an input result of the transmission destination of the fax machine 300 on the other side (fax number on the other side) by the user using the ten-key or the like.

In addition, a new addition key K9 is disposed on the right side of the input result display area F2. When this new addition key K9 is pressed, a screen for input of an destination name or the like is displayed so as to register and store a destination name, a fax number on the other side, and the like in the memory 17 or the storage device 92 of the multifunction peripheral 100. Further, the registered destination name and destination address can be displayed as a list on the address book screen. Although not illustrated, it is possible to set a transmission destination by specifying an address in the address book screen.

In addition, an address input method specifying key group G4 is disposed on the lower side of the input result display area F2. For instance, a fax address book key K10 for displaying an address book screen for fax transmission is disposed in the address input method specifying key group G4. When the fax address book key K10 is pressed, the liquid crystal display unit 8 displays an address book screen that is a list display of transmission destination information such as destination names and addresses in the state where the addresses are narrowed to those storing fax numbers.

On the other hand, an address book key K11 for displaying an address book screen including transmission destinations other than faxes (e.g., e-mail or the like) is also disposed in the address input method specifying key group G4. When the address book key K11 is pressed, the liquid crystal display unit 8 displays the address book screen that is a list display of transmission destination information including destination names and addresses in the state where the fax numbers are not narrowed.

Here, as illustrated in FIG. 5A, in order to assist the address input (input of a fax number on the other side) by the user, the liquid crystal display unit 8 displays the re-addressing button B1 in the input result display area F2 (the re-addressing button B1 may be displayed in an adjacent area the input result display area F2). When the re-addressing button B1 in the fax transmission destination input screen S2 is pressed, similarly to the case illustrated in FIGS. 4A and 4B, the liquid crystal display unit 8 performs the display using the transmission history stored in the memory 17 of the operation panel 1 or in the storage device 92 of the main body of the multifunction peripheral 100.

When the re-addressing button B1 is pressed, for example, the liquid crystal display unit 8 displays a list of fax transmission destinations included in the transmission history (e.g., in a pull-down menu format). Then, when the transmission destination in the display is selected (pressed), the liquid crystal display unit 8 displays the address of the transmission destination in the input result display area F2. Thus, the destination that has been input can be set without inputting each fax number.

Note that it is possible to adopt a configuration in which only the fax transmission destination that has been used in the just previous transmission is displayed when the re-addressing button B1 is pressed, in view of information security. In addition, in view of information security, it is possible to adopt a configuration in which the fax transmission history is erased in turn when a constant time (e.g., a few minutes to a few tens of minutes) has passed from the transmission. Alternatively, it is possible to adopt a configuration in which the input function using the re-addressing button B1 is disabled instead of erasing the fax transmission history.

For instance, for example, when the fax transmission job has not been performed at all from the main power is turned on, there may be no transmission history of the fax transmission. In this way, when there is no transmission history in the memory 17 or the storage device 92 so that the auxiliary function of the destination input (specifying a destination) by the re-addressing button B1 cannot be used, the liquid crystal display unit 8 does not display the re-addressing button B1 as illustrated in FIG. 5B.

(Display or No Display of Button, Conversion Button B2)

Figure 6A:
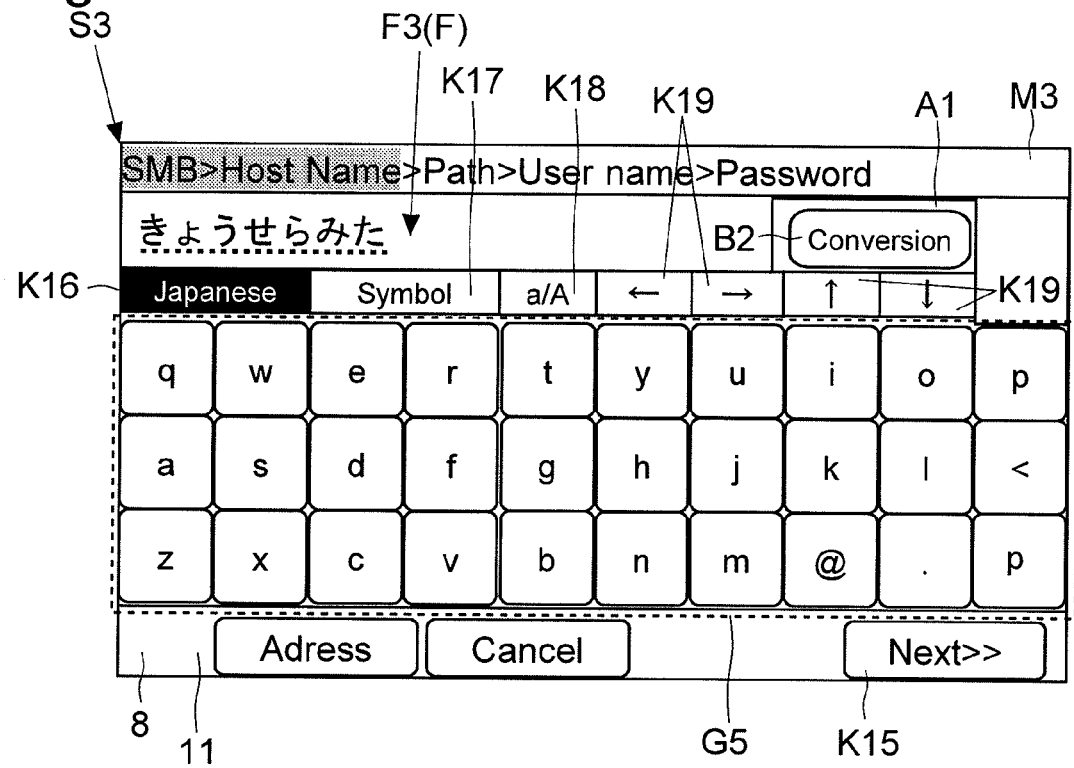
FIGS. 6A and 6B are explanatory diagrams illustrating an example of a character input screen displayed on the liquid crystal display unit according to the embodiment when image data is transmitted to an external computer.
Figure 6B:
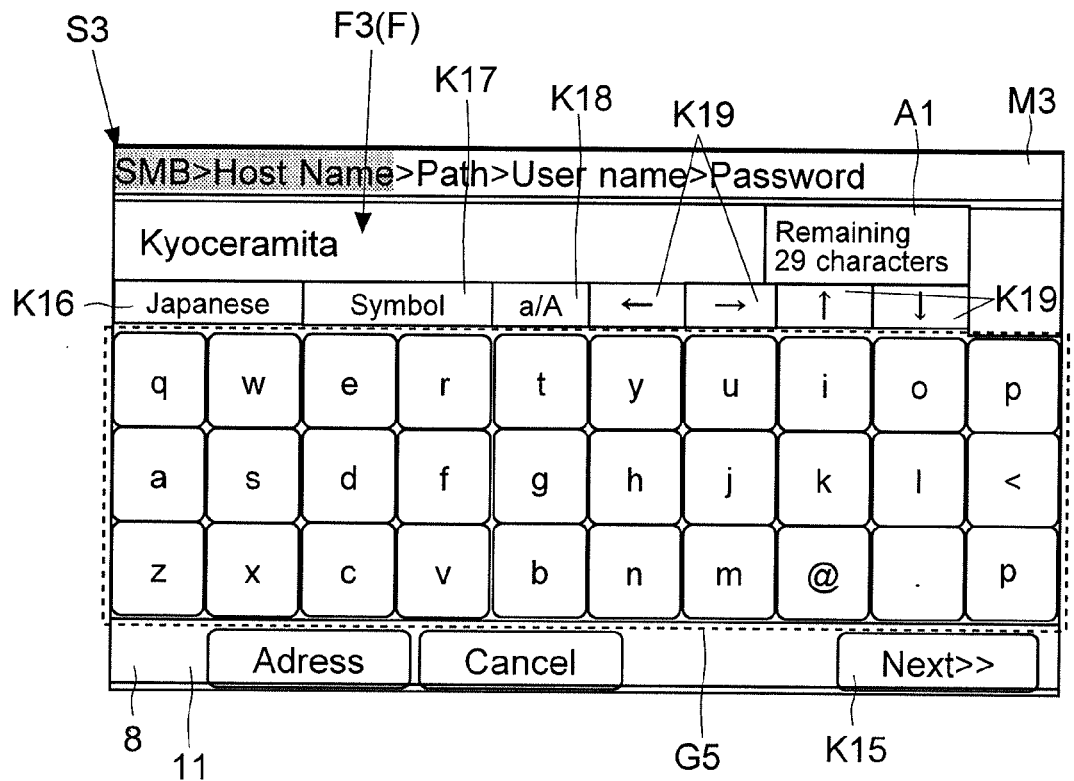

Next, with reference to FIGS. 6A and 6B, an example of display or no display of a button on the liquid crystal display unit 8 according to the embodiment of the present invention will be described with an example of a character input screen. FIGS. 6A and 6B are explanatory diagrams illustrating an example of the character input screen displayed on the liquid crystal display unit 8 according to the embodiment of the present invention when image data is transmitted to the external computer 200. FIG. 6A illustrates a case where the conversion button B2 is displayed. FIG. 6B illustrates a case where the conversion button B2 is not displayed.

The multifunction peripheral 100 in this embodiment has many settable functions. Further, in the multifunction peripheral 100 of this embodiment, there are some cases in which input of characters (e.g., alphabets, kana, kanji, or the like) is required in particular.

For instance, input of characters is required in particular in the case where a name of destination is input and registered in the address book, in the case where a file name is assigned to image data read by the image reader unit 2, in the case where address information of transmission destination of document image data is input, in the case where a user or an administrator of the multifunction peripheral 100 is set, in the case where a password is input, or in other cases.

Then, when the character input is required, the liquid crystal display unit 8 of this embodiment displays a software keyboard input screen S3. Also in this software keyboard input screen S3, an input result display area F (F3) on which a result of input by the software keyboard is disposed on the liquid crystal display unit 8. In other words, the liquid crystal display unit 8 reflects the input result on the input result display area F (F3) to be displayed.

In addition, the multifunction peripheral 100 of this embodiment has an auxiliary function for the user to input also in the character input using the software keyboard. With reference to FIGS. 6A and 6B, an example of the conversion function in the software keyboard input screen S3 (character input screen) will be described, which is displayed when the PC transmission key K3 illustrated in FIGS. 4A and 4B is pressed, for inputting address information of the computer 200 as an image data transmission destination. Note that this conversion function is used for inputting Japanese (an input example using alphabets will be described later). In other words, the operation panel 1 of this embodiment has a Japanese input function.

First, when the liquid crystal display unit 8 transmits the image data to the PC, for example, it displays the software keyboard input screen S3 illustrated in FIGS. 6A and 6B for inputting address information of the PC. A message display section M3 is disposed on the uppermost part of the software keyboard input screen S3, for example (FIGS. 6A and 6B illustrates a state where a message "Host Name>Path>User Name>Password>" is displayed).

The message illustrated in FIGS. 6A and 6B shows that inputs of characters or the like are required in the item order of a host name, a path, a user name, and a password. Further, the liquid crystal display unit 8 changes a display color until the item that is currently displayed (FIGS. 6A and 6B illustrate with shading). For instance, the software keyboard input screen S3 illustrated in FIGS. 6A and 6B is a screen for inputting a host name. Further, a next key K15 is disposed on the lower side of the software keyboard input screen S3. When the next key K15 is pressed, the liquid crystal display unit 8 displays the software keyboard input screen S3 for inputting the next input item (a path in the example illustrated in FIGS. 6A and 6B).

Further, an input result display area F3 is disposed on the lower side of the message display section M3. Specifically, a result of the input by the user using the software keyboard is displayed in the input result display area F3 of the software keyboard input screen S3.

An input key group G5 is disposed on the lower side of the input result display area F3. Besides the alphabets, symbols such as "@", "<", and "." that are often used for address input are included in the input key group G5. In addition, a Japanese key K16, a symbol key K17, an upper/lower case selection key K18, four arrow keys K19, and the like are disposed on the upper side of the input key group G5.

For instance, when the Japanese key K16 is pressed, the user can perform kana input using Romaji (Japanese expression method using alphabets). As illustrated in FIG. 6A, in the Japanese input mode, for example, the Japanese key K16 becomes a black and white reversal state. On the contrary, as illustrated in FIG. 6B, when the Japanese key K16 is not in the black and white reversal state, the user can perform alphabet input (as an alphabet input mode). Note that it is possible to input numbers using the ten-key unit 12.

In addition, for example, when the symbol key K17 is pressed, the liquid crystal display unit 8 displays keys with symbols such as "!", "#", "%", """, "*", and the like instead of the alphabet keys. By pressing the keys with symbols, the user can perform various symbol inputs. In addition, for example, when the upper/lower case selection key K18 is pressed, the liquid crystal display unit 8 displays while switching between uppercase and lowercase of each alphabet key. By pressing the upper/lower case selection key K18, the user can input uppercase or lowercase of alphabet.

Further, as illustrated in FIG. 6A, the liquid crystal display unit 8 displays the conversion button B2 for converting kana to kanji in an adjacent area A1 neighboring the input result display area F3. The conversion button B2 is pressed for converting kana into kanji in the Japanese input. For instance, kana characters before confirmation are displayed with a wavy underline as illustrated in FIG. 6A.

When the conversion button B2 is pressed, the liquid crystal display unit 8 displays a list of conversion candidates. For instance, in the example illustrated in FIG. 6A, when the conversion button B2 is pressed, a character string including kanji is displayed as conversion candidates. Then, the user selects a character string to be converted, using the arrow key K19. The liquid crystal display unit 8 displays the selected kanji in the input result display area F3. Thus, the user can perform kanji input. Note that, for example, the display control unit 10 performs the conversion process from kana into a character string including kanji, using kanji data and a conversion program stored in the memory.

On the other hand, as illustrated in FIG. 6B, in the case of alphabet input, the conversion into kanji is not necessary. Therefore, the liquid crystal display unit 8 does not display the conversion button B2 in the adjacent area A1. Further, instead of the conversion button B2, information about limitation of number of characters (the number of characters that can be input) is displayed in the adjacent area A1. Thus, the display area of the liquid crystal display unit 8 can be used effectively.

(Display or No Display of Button, History Button B3)

Next, with reference to FIGS. 7A and 7B, an example of display or no display of a button on the liquid crystal display unit 8 according to the embodiment of the present invention will be described with an example of a character input screen.

Figure 7A:
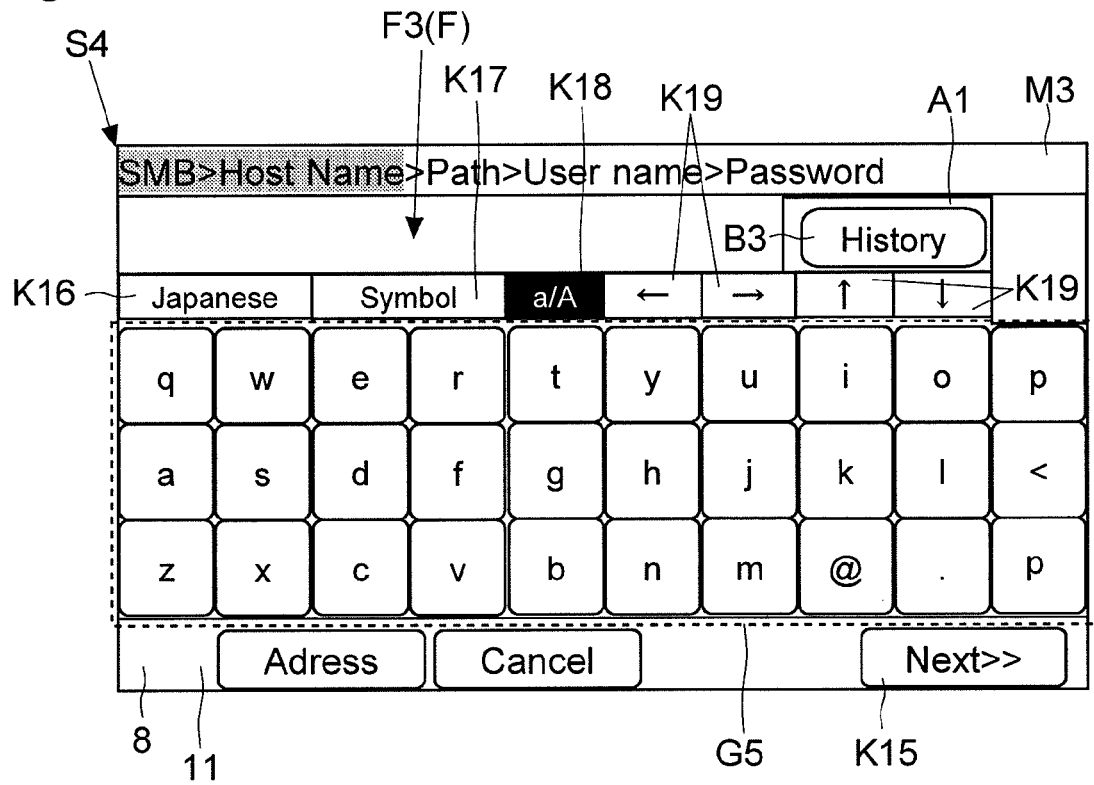
FIGS. 7A and 7B are explanatory diagrams illustrating an example of a character input screen displayed on the liquid crystal display unit according to the embodiment when image data is transmitted to the external computer.
Figure 7B:
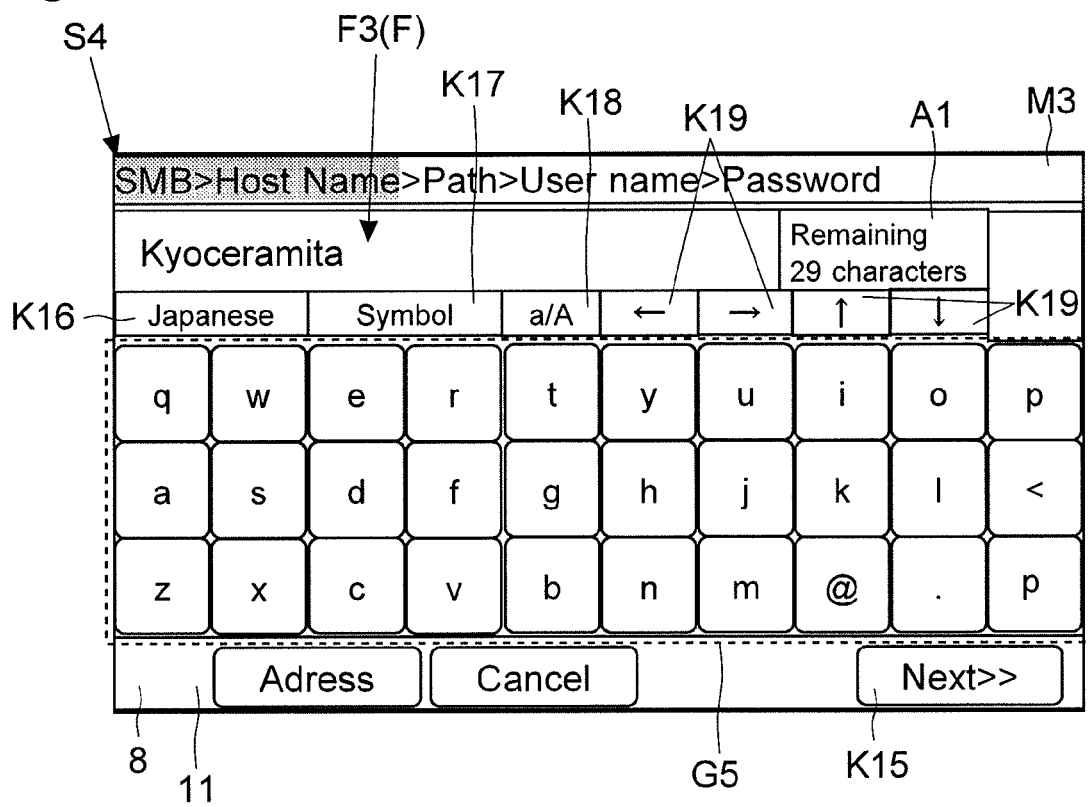

FIGS. 7A and 7B are explanatory diagrams illustrating an example of the character input screen displayed on the liquid crystal display unit 8 according to the embodiment of the present invention when image data is transmitted to the external computer 200. FIG. 7A illustrates a case where the history button B3 is displayed. FIG. 7B illustrates a case where the history button B3 is not displayed.

As described above, the operation panel 1 and the multifunction peripheral 100 of this embodiment need character input, and alphabet input can be performed when the liquid crystal display unit 8 displays a software keyboard input screen S4. Also in this software keyboard input screen S4, an input result display area F (F3) is disposed in the liquid crystal display unit 8 for reflecting a result of input by the software keyboard.

Further, the operation panel 1 and the multifunction peripheral 100 of this embodiment have an auxiliary function for the user to input also in the alphabet input using the software keyboard. Similarly to FIGS. 6A and 6B, an example of the alphabet input in the software keyboard input screen S4 (character input screen) will be described.

Basically, the software keyboard input screen S4 illustrated in FIGS. 7A and 7B is similar to the software keyboard input screen S3 described above with reference to FIGS. 6A and 6B concerning a layout of keys and functions of keys. Therefore, overlapping description thereof is omitted. However, the software keyboard input screen S4 illustrated in FIGS. 7A and 7B is different from the software keyboard input screen S3 illustrated in FIGS. 6A and 6B in that the Japanese key K16 is not pressed (it is not the Japanese input mode), but it is the alphabet input mode.

Further, as illustrated in FIG. 7A, the liquid crystal display unit 8 displays the history button B3 in the adjacent area A1 neighboring the input result display area F3 for input assist in the alphabet input (the history button B3 may be displayed in the input result display area F3). The history button B3 is pressed when performing input on the basis of history of the character string that has been input in the past using the alphabets and symbols.

In addition, in the operation panel 1 and the multifunction peripheral 100 of this embodiment, the input history is saved. Character strings of alphabets and symbols that have been input in the past are included in the input history. This input history is stored in the memory 17 of the operation panel 1 or in the storage device 92 of the main body of the multifunction peripheral 100. For instance, the memory 17 or the storage device 92 stores the transmission history in a volatile manner, so that the input history is lost when the main power supply of the multifunction peripheral is turned off. For instance, the memory 17 or the storage device 92 stores the contents of input by the user using alphabets and symbols in the past as items such as "Host Name", "Path", or "User Name" as the input history in a volatile manner.

When the history button B3 is pressed, the liquid crystal display unit 8 displays a list of the history using the input history stored in the memory 17 or the storage device 92. For instance, when the history button B3 is pressed, the liquid crystal display unit 8 displays, for example, host computer names, paths, and user names that have been input in the past. For instance, the liquid crystal display unit 8 displays the alphabets and symbols that have been input in the past on the lower side of the history button B3 in a pull-down menu format.

Further, when the input character string displayed in the history is selected (pressed), the selected character string is called, so that the liquid crystal display unit 8 displays the selected character string in the input result display area F3.

Thus, the character string can be accepted as the input without performing each input operation.

Note that in view of information security, it is possible to adopt a configuration in which when the history button B3 is pressed, only the character string of alphabets and symbols that has been input just before is displayed (or is accepted as the input). In addition, in view of information security, it is possible to adopt a configuration in which the input history is erased in turn when a constant time (e.g., a few minutes to a few tens of minutes) has passed from the input.

However, as in the case where the input using alphabets and symbols has not been performed at all from the main power is turned on, the input history may not exist. When the memory 17 or the storage device 92 stores no input history so that the auxiliary function of alphabet input by the history button B3 cannot be used, the liquid crystal display unit 8 does not display the history button B3 as illustrated in FIG. 7B. Further, instead of the history button B3, information about limitation of number of characters (the number of characters that can be input) is displayed in the adjacent area A1. Thus, the display area of the liquid crystal display unit 8 can be used effectively.

(Display Control)

Figure 8:
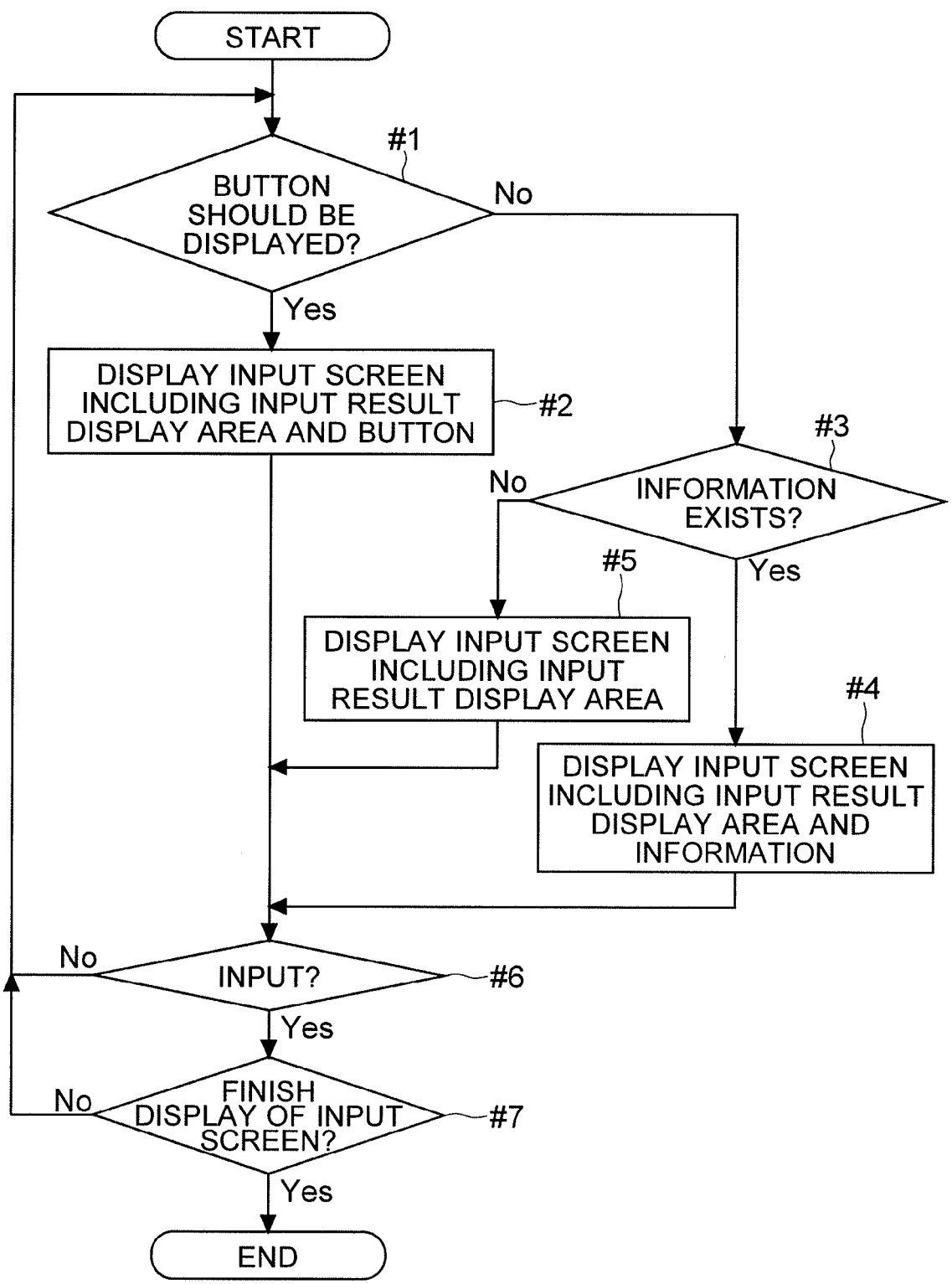
FIG. 8 is a flowchart of an example of display control of characters, numbers, symbols, or the like on the input screen according to the embodiment.

Next, with reference to FIG. 8, an example of display control in the input screen of characters, numbers, symbols, or the like according to the embodiment of the present invention will be described. FIG. 8 is a flowchart illustrating an example of display control in the input screen of characters, numbers, symbols, or the like according to the embodiment of the present invention.

First, the process flow illustrated in FIG. 8 starts when the user operates the operation panel 1 so that the liquid crystal display unit 8 displays any of various input screens that require display of the input result display area F. For instance, it starts when the transmission key 16 of the operation panel 1 is pressed so that it is necessary to display the destination input screen S1, the fax transmission destination input screen S2, or the software keyboard input screen S3.

The display control unit 10 checks, for example, whether or not there is a button of an available auxiliary input function such as the re-addressing button B1, the conversion button B2, or the history button B3 so that the button should be displayed (Step #1). When there is a button of the auxiliary input function to be displayed (Yes in Step #1), the display control unit 10 controls the liquid crystal display unit 8 to display each input screen including the input result display area F and the button to be displayed (Step #2).

On the other hand, when there is no button to be displayed (No in Step #1), the display control unit 10 checks whether or not there is information about limitation of number of characters to be displayed instead of the button (information to be displayed when the button is not display) (Step #3).

When there is information to be displayed (Yes in Step #3), the display control unit 10 controls the liquid crystal display unit 8 to display each input screen including the input result display area F and the information (Step #4). On the contrary, when there is no information to be displayed (No in Step #3), the display control unit 10 controls the liquid crystal display unit 8 to display each input screen including the input result display area F (Step #5, the button and the information are not displayed).

In other words, the display input device (operation panel 1) includes an input unit (touch panel unit 11 or the like) which receives an operation input, and a display unit (liquid crystal display unit 8) which displays a screen for operation input and includes an input result display area F for reflecting the input to the input unit (touch panel unit 11 or the like) so as to display at least a number and a character, in which when there is an available function for inputting the number and the character, the display unit displays an input button (re-addressing button B1, conversion button B2, history button B3, or the like) for using the available function in the input result display area F or in the adjacent area A1 of the input result display area F, while when there is no available function, the button is not displayed in the input result display area F or in the adjacent area A1 of the input result display area F. Further, the display unit displays (may display) information about input instead of the button when the button is not displayed.

Further, the display control unit 10 checks whether or not the user has performed input with the operation panel 1 after Steps #2, #4, and #5 (Step #6). When the input has not been performed (No in Step #6), for example, the process should go back to Step #1. Thus, necessity of the button display and the information display is always checked.

On the other hand, when the user performs the input, the display control unit 10 checks whether or not to finish the display of the input screen, for example, in the case where the start key 13 is pressed so that execution of the job is instructed, or in the case where switching to a display of another function setting screen is instructed (Step #7). In other words, the display control unit 10 checks whether or not the display condition of the input screen such as characters is eliminated.

When it is still necessary to display the input screen (No in Step #7), the process should go back to Step #1, for example. Further, in Step #1, the liquid crystal display unit 8 reflects a result of the input by the user on the input result display area F for displaying. On the other hand, when it becomes unnecessary to display the input screen (Yes in Step #7), the display control unit 10 should finish this control (END).

In this way, with the present invention, when there is an available function for inputting numbers and characters, an input button for using the available function (re-addressing button B1, conversion button B2, history button B3, or the like) is displayed in the input result display area F or in the adjacent area A1 of the input result display area F, while when there is no available function, the button is not displayed in the input result display area F or in the adjacent area A1 of the input result display area F.

Thus, the input button for using the available function in inputting numbers and characters (re-addressing button B1, conversion button B2, history button B3, or the like) is always displayed at the position close to the input result display area F. Therefore, it can be understood through intuition that a result of the button operation is reflected on the input result display area F and about use timing of the button. In addition, it is possible to convey to the user securely that the function is available. In addition, when there is no available function, the button is not displayed. Therefore, waste of the screen area can be eliminated so that the screen area can be used effectively.

In addition, when the button (re-addressing button B1, conversion button B2, history button B3, or the like) is not displayed, information about the input is displayed instead of the button. Thus, waste of the screen area can be eliminated so that the screen area can be used effectively.

In addition, the button is the re-addressing button B1 for calling the address of the data transmission that was performed before. Thus, the re-addressing button B1 is displayed in the input result display area F or adjacent to the same. Therefore, even if a panel size of the display unit (liquid crystal display unit 8) is small, the re-addressing button B1 can be securely recognized visually. Therefore, visibility of the re-addressing button B1 is improved. In addition, it is possible to prevent a fail to press the re-addressing button B1 or overlooking of the same, so that convenience for the user in inputting the numbers or the like can be improved.

In addition, in inputting of numbers, characters, and symbols with the image forming apparatus (e.g., multifunction peripheral), it can be understood through intuition that a result of operation of the button (re-addressing button B1, conversion button B2, history button B3, or the like) is reflected on the input result display area F, and about use timing of the button. In addition, it is possible to convey to the user securely that the function is available. In addition, when there is no available function, the button is not displayed so that the screen area can be used effectively. Therefore, it is possible to provide an image forming apparatus having no waste of display and enables to understand through intuition about use timing and which button operation is reflected on which area.

Next, other embodiments will be described. Although the re-addressing button B1 or the conversion button B2 is exemplified in the embodiment described above, the present invention can be applied to other buttons concerning input of characters and numbers. For instance, it can be applied also to the button for calling the image data file that is already stored in the storage device 92 with a name (history of inputted the image data name). it can be applied also to the button for assigning a name to the image data (inputting the name) obtained by reading with the image reader unit 2 (history of inputted the image data name). Therefore, the present invention is not limited to the function of the re-addressing button B1 or the conversion button B2.

Although the embodiment of the present invention is described above, the scope of the present invention is not limited to this embodiment, but can be performed with various modifications within the scope of the present invention without deviating from the spirit thereof.

What is claimed is:

1. A display device for a data transmission apparatus that is configured to save a transmission history of data transmissions made thereby, said display device comprising:
   an input unit that receives operation inputs;
   a display unit that displays screens according to the operation inputs, the display unity displaying a destination input screen and a fax transmission destination input screen as screens provided with an input result display area reflecting an input of a transmission destination to the input unit by a user, the input result display area displaying an input result including at least a number and a character; and
   a display control unit determining, at a time when the display unit starts display of the destination input screen and the fax transmission destination input screen, to cause the display unit to display a re-addressing button, in the input result display area or in an area adjacent to the input result display area, if the data transmission apparatus has saved the transmission history, and to cause the display unit to not display the re-addressing button if the data transmission apparatus has not saved the transmission history, the re-addressing button calling up an address of a previous data transmission within the transmission history.

2. A display device according to claim 1, wherein when the re-addressing button is not displayed, the display unit displays other information about input instead of the re-addressing button.

3. An image forming apparatus comprising the display device according to claim 1, the image forming apparatus being the data transmission apparatus and transmitting image data.

4. A method of displaying for a data transmission apparatus that is configured to save a transmission history of data transmissions made thereby, said display method comprising:
   receiving operation inputs at an input unit;
   displaying, by a display unit, screens according to the operation inputs, said displaying including displaying a destination input screen and a fax transmission destination input screen as screens provided with an input result display area reflecting an input of a transmission destination to the input unit by a user, the input result display area displaying an input result including at least a number and a character; and
   controlling, by a display control unit, at a time when the display unit starts display of the destination input screen and the fax transmission destination input screen, the display unit to display a re-addressing button, in the input result display area or in an area adjacent to the input result display area, if the data transmission apparatus has saved the transmission history, and not to display the re-addressing button if the data transmission apparatus has not saved the transmission history, the re-addressing button calling up an address of a previous data transmission within the transmission history.

5. A displaying method according to claim 4, wherein when the re-addressing button is not displayed, information about other input is displayed instead of the re-addressing button.

* * * * *